United States Patent [19]
Byrne

[11] Patent Number: 5,805,142
[45] Date of Patent: Sep. 8, 1998

[54] COMPUTER MOUSE WITH SENSORY ALERTING TO PREVENT HUMAN INJURY

[75] Inventor: Kevin P. Byrne, Westminster, Colo.

[73] Assignee: Lucent Technologies Inc., Murray Hill, N.J.

[21] Appl. No.: 543,583

[22] Filed: Oct. 16, 1995

[51] Int. Cl.$^6$ ........................................ G09G 5/08
[52] U.S. Cl. ............................. 345/163; 345/157
[58] Field of Search ..................... 345/163, 157, 345/160, 161, 167; 395/806, 348

[56] References Cited

U.S. PATENT DOCUMENTS

| | | | |
|---|---|---|---|
| 4,884,972 | 12/1989 | Gasper | 395/806 |
| 5,287,102 | 2/1994 | McKiel, Jr. | 395/348 |
| 5,413,294 | 5/1995 | Greenquist | 248/127 |
| 5,555,894 | 9/1996 | Doyama et al. | 345/163 |

FOREIGN PATENT DOCUMENTS

| | | | |
|---|---|---|---|
| 0346859 | 12/1989 | European Pat. Off. | |
| 60-17528 | 1/1985 | Japan | 345/163 |

OTHER PUBLICATIONS

IBM, Corp., Seeing Eye Mouse, IBM Technical Disclosure Bulletin, vol. 28, No. 3, pp. 1343–1344, Aug. 1985.
"Plight of the Modern Mouse", *Managing Office Technology*, Mar. 1994, pp. 49–50.
*Pressure–Sensitive Mouse*, IBM Technical Disclosure Bulletin, vol. 35, No. 6, 1 Nov. 1992, pp. 288–289.

*Primary Examiner*—Richard A. Hjerpe
*Assistant Examiner*—Kent C. Lang
*Attorney, Agent, or Firm*—John C. Moran

[57] ABSTRACT

Determining by a computer mouse the pressure that an operator uses to grip the mouse and to actuate switches on the mouse and alerting the operator by the mouse if the pressure is excessive. This monitoring and alerting gives the operator immediate and consistent feedback on misuse of the mouse. In a first embodiment, the computer mouse alerts the operator to excessive pressure by means of an audio alarm. In the second embodiment, the computer mouse transmits the pressure information to a connected computer. The computer can alert the operator with an audio message or alert the operator by displaying the alerting information on a display screen of the computer.

14 Claims, 8 Drawing Sheets

COMPUTER MOUSE WITH SENSORY ALERTING TO PREVENT HUMAN INJURY

TECHNICAL FIELD

This invention relates to peripheral equipment for computers, and, in particular, to a computer mouse that alerts the operator when misuse of the mouse may injure the operator over time.

BACKGROUND OF THE INVENTION

With the increase use of computer mice with personal computers and work stations, there have been a large number of cumulative trauma disorders attributed to the use of computer mice. Overall, cumulative trauma disorders are a large national problem. In 1993, U.S. Bureau of Labor Statistics reported 302,000 cases of cumulative trauma disorder which was a 70% increase from 1992 and a 63% increase from 1990. 80% of all occupational illness in 1993 was caused by repetitive motion. These disorders are economically quite important since they result in a large potential liability of an employer to the employees who are afflicted. Most important, they causes a loss of production and affect the morale of the employees. With respect to loss of production, the average lost time for an injury due to cumulative trauma disorder is 20 days whereas the average lost time for all occupational illness is 6 days. Cumulative trauma disorders may occur when over an extended period of time (1) the user grips the mouse too tightly or (2) the user exerts too much pressure on one of the selection keys. These two actions cause the muscles within the operator's arm to contract and as the operator moves the mouse cause strain on the hand and the arm of the operator. In particular, when the operator is performing the operation of highlighting which involves pressing one of the selection keys with a finger and moving the mouse, it is common for the operator to exert large amounts of pressure on the finger. A discussion of this and other misuses of a mouse are detailed in D. Quilter, et al. *Repetitive Strain Injury: A Computer User's Guide*, John Wiley & Sons, Inc., 1994.

The prior art has attempted to solve these problems by redesigning the mouse and the surfaces on which the mouse is used. For example, there are keyboards that now incorporate the functions of the mouse into a track ball mounted on a computer keyboard. In addition, there are many different physical configurations of a mouse in existence. U.S. Pat. No. 5,413,294 discloses a platform that is designed to cover a portion of the keyboard for use with a mouse. A mouse positioned on this platform and is much closer to the operator's hands when resting on the keyboard.

Although the improvements in the physical design of the mouse and the work surfaces used with the mouse have helped reduce some of the cumulative trauma disorder problems, these methods have not addressed the problem of the operator gripping the mouse too tightly and pressing too hard with the finger on one of the switches.

There exists a need in the prior art for a mechanism to monitor the pressure applied to the mouse by the operator gripping the mouse and the pressure applied to the switches on the mouse.

SUMMARY OF THE INVENTION

The foregoing problems are solved, and a technical advance in the art is achieved by a computer mouse that determines the pressure that an operator uses to grip the mouse and to actuate switches on the mouse, and the mouse alerts the operator if the pressure is excessive. This monitoring and alerting gives the operator immediate and consistent feedback on misuse of the mouse. In a first embodiment, the computer mouse alerts the operator to excessive pressure by means of an audio alarm. In the second embodiment, the computer mouse transmits the pressure information to a connected computer. The computer can advantageously alert the operator with an audio message or alert the operator by displaying the alerting information on a display screen of the computer.

These and other advantages and features of the invention will become apparent from the following description of illustrative embodiments of the invention taken together with the drawing.

DETAILED DESCRIPTION

Figure 1:
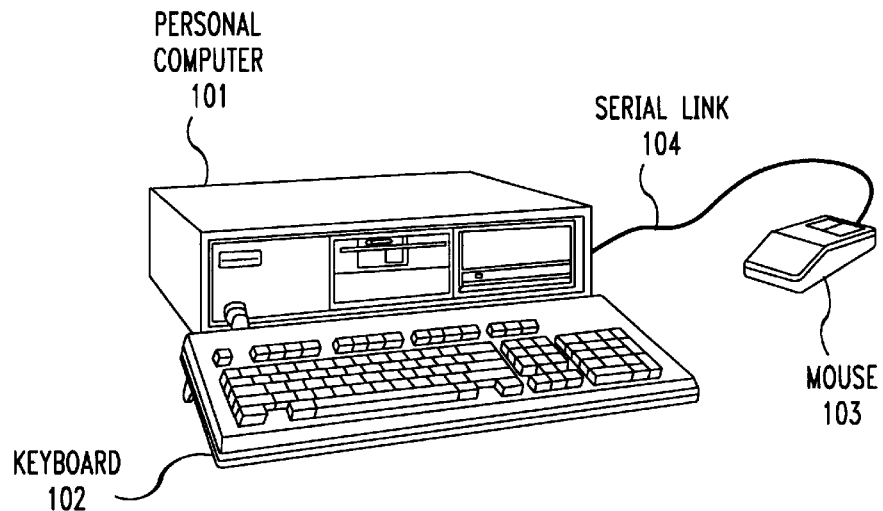
FIG. 1 illustrates, in block diagram form, a mouse interconnected to a personal computer.
Figure 2:
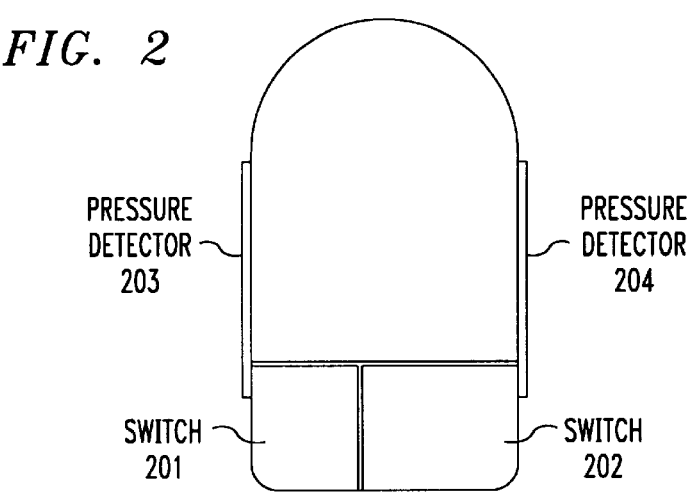
FIG. 2 illustrates a top view of a mouse in accordance with the invention.
Figure 3:
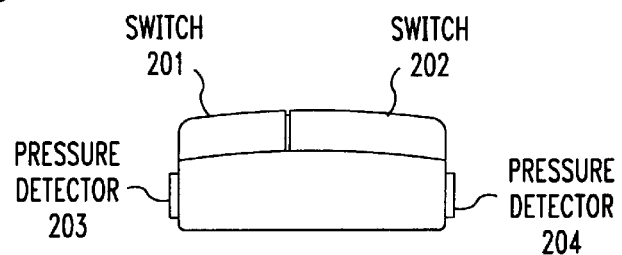
FIG. 3 illustrates a front view of the computer mouse of FIG. 2.

FIG. 1 illustrates the interconnection of mouse 103 to personal computer 101. FIG. 2 illustrates the top view of a mouse in accordance with the invention. Switches 201 and 202 perform the customary functions on a computer mouse; however, these switches also provide information concerning the amount of pressure being exerted on them. Pressure detectors 203 and 204 are positioned so as to have the force applied by the operator in gripping the mouse applied to these pressure detectors. One skilled in the art could readily see that pressure detectors 203 and 204 could be adapted to different shapes of computer mice, and additional pressure detectors could be utilized. Further, one skilled in the art would also immediately realize that additional switches could be utilized in addition to switches 201 and 202. FIG. 3 illustrates a front view of the computer mouse of computer 2.

Figure 4:
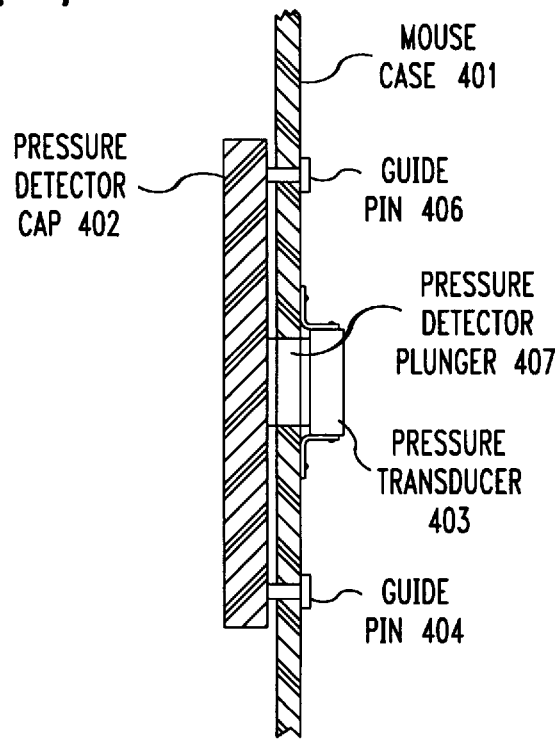
FIG. 4 illustrates a pressure detector utilized in a computer mouse.

FIG. 4 illustrates in greater detail pressure detector 203. Pressure detector 204 is similar in design. Pressure detector cap 402 and pressure detector plunger 407 are physically stabilized by guide pins 404 and 406. Pressure detector plunger 407 is in contact at all times with pressure transducer 403. When a user exerts pressure on pressure detector cap 402, this pressure is transmitted to pressure transducer 403 via pressure detector plunger 407. Pressure transducer 403 may advantageously be a piezo-electric type transducer. Alternatively, a strain gauge or other types of transducer may also be employed.

Figure 5:
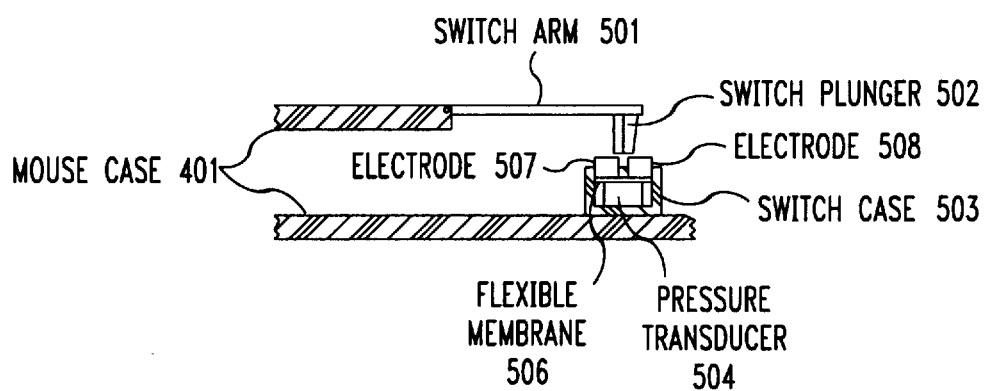
FIG. 5 illustrates a switch utilized in a computer mouse.

FIG. 5 illustrates details of switch 201 of FIG. 2. Switch 202 is similar in design. Switch arm 501 is capable of pivoting downward from mouse case 401. As switch 501 pivots downward, switch plunger 502 makes contact with electrodes 507 and electrodes 508. The face of switch plunger 502 making contact with electrodes 507 and 508 is conductive thus completing an electrical circuit between electrodes 507 and 508. The ability of switch plunger 502 to make an electrical circuit between the electrodes performs the switch functions of switch 201.

Electrodes 507 and 508 are mounted on flexible membrane 506 and connections to these electrodes are made via paths on flexible membrane 506. Note that there are no wires illustrated as leaving the apparatus of FIG. 5 but that this would be obvious to one skilled in the art. As switch plunger 502 makes contact with electrodes 507 and 508, flexible membrane 506 transmits that force from switch plunger 502 onto pressure transducer 504. Pressure transducer 504 is similar to pressure transducer 403.

Figure 6:
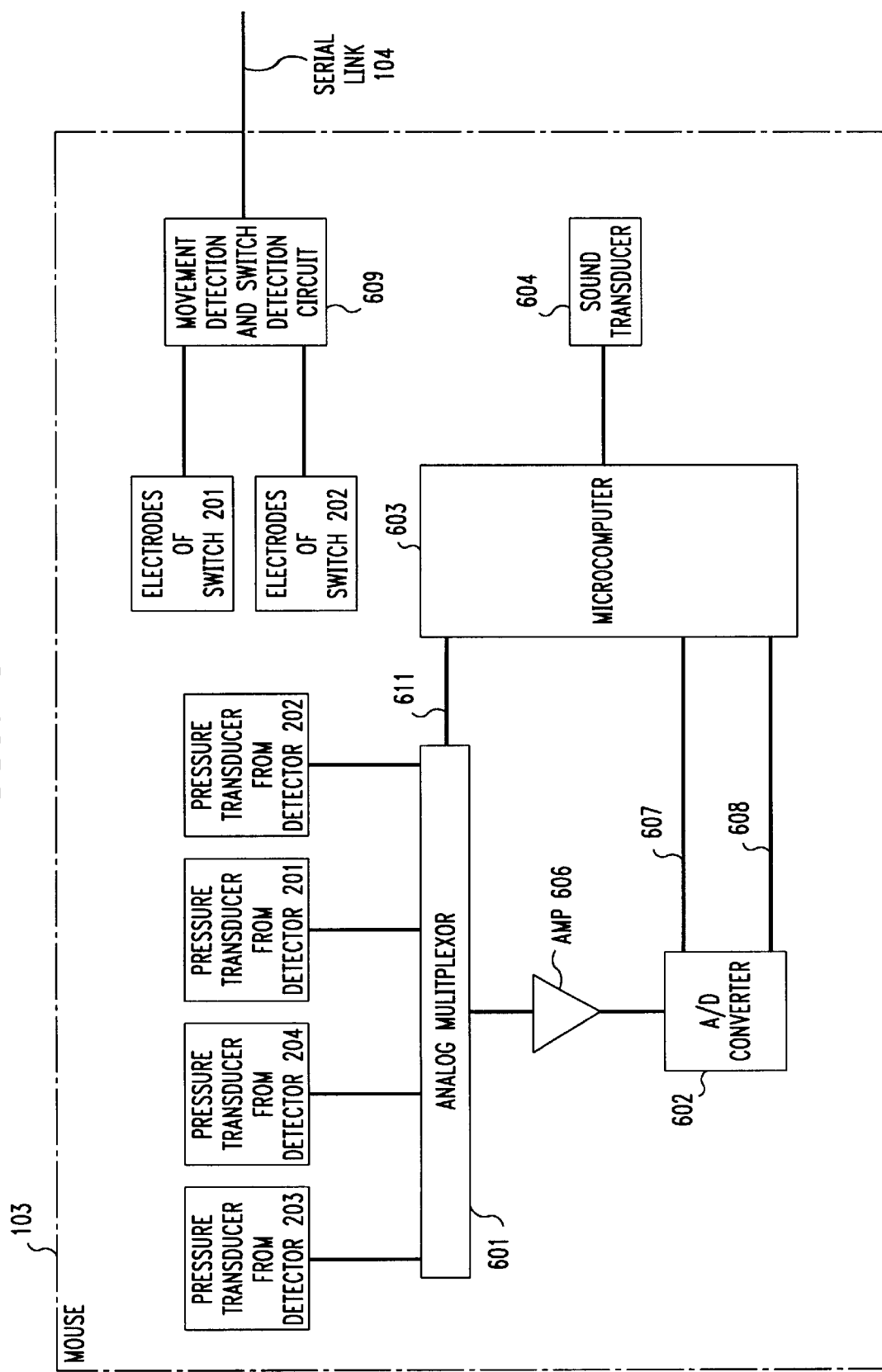
FIG. 6 illustrates, in block diagram form, the circuitry of a computer mouse.

FIG. 6 illustrates the electrical circuitry of the computer mouse of FIG. 2. The standard functions of a computer mouse are implemented by movement detection and switch detection circuit 609. Block 609 transmits the normal functional signals to personal computer 101 of FIG. 1 via serial link 104. The function of detecting pressure and determining when this pressure is excessive is performed by the remainder of the circuitry illustrated on FIG. 6. Microcomputer 603 is continuously scanning the pressure applied to the pressure transducers of switches 201 and 202 and the pressure transducers of detectors 203 and 204. Microcomputer 603 performs this scanning function by selecting the output of a pressure transducer by transmission of an address on bus 611 to multiplexor 601. Multiplexor 601 is responsive to the address to select the output analog signal of the addressed pressure transducer and transmit this analog signal to amplifier 606. A/D converter 602 is responsive to the output from amplifier 606 to convert the analog signal to a digital value and to transmits this digital value to microcomputer 603 via bus 608. Microcomputer 603 analyzes each digital value to determine the pressure and generates an audio sound via sound transducer 604 if the pressure exceeds a predefined value for a particular pressure transducer. The predefined pressure is advantageously a pressure of 100 grams. Advantageously, one skilled in the art would readily see that under certain circumstances it would be desirable to add the pressures applied to detectors 203 and 204 in order to calculate the total pressure that the operator is utilizing to grip the computer mouse.

Figure 7:
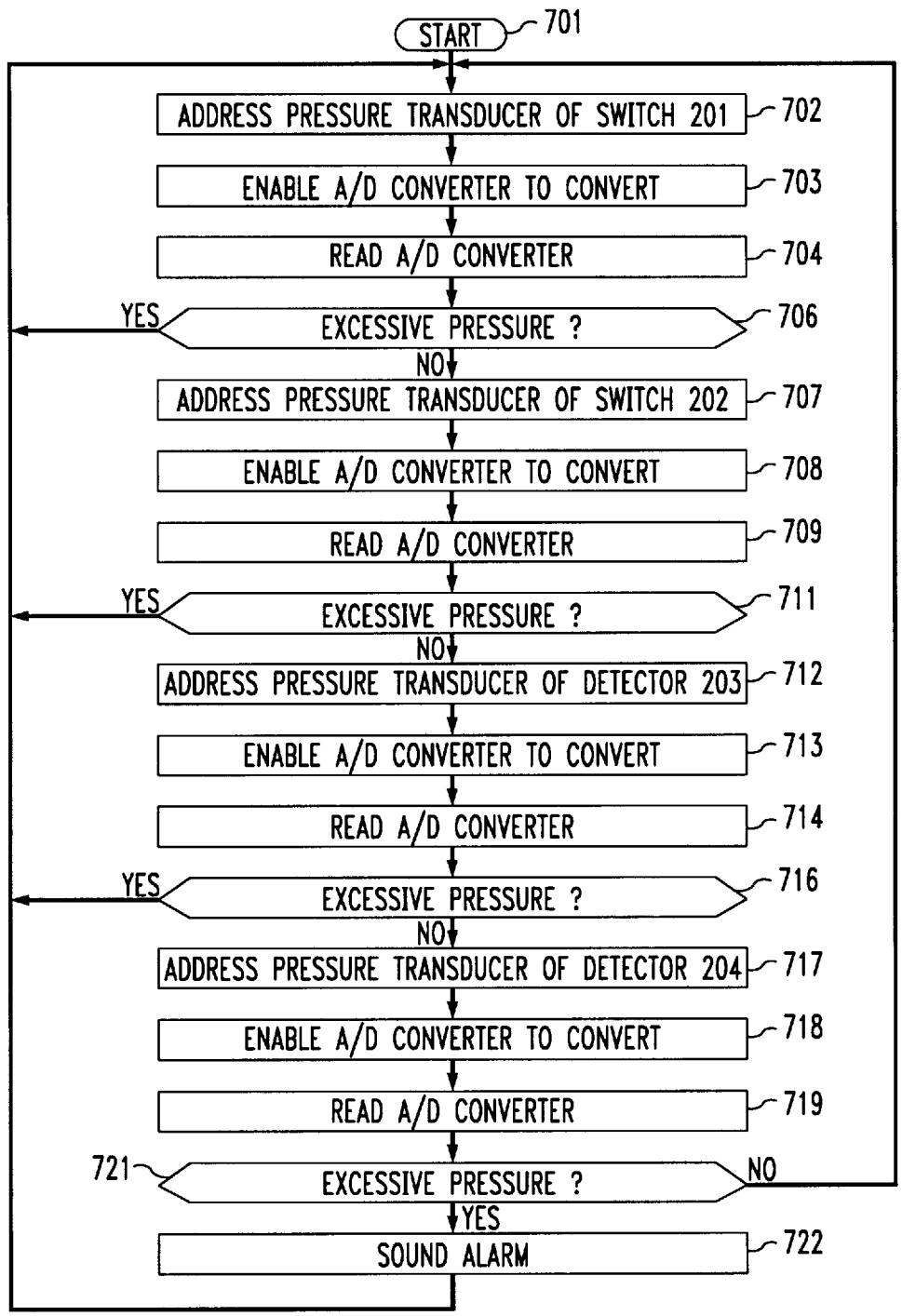
FIG. 7 illustrates, in flow chart form, the operations of a microcomputer within a computer mouse.

FIG. 7 illustrates, in flow chart form, the program being executed by microcomputer 603 of FIG. 6. Microcomputer 603 continuously monitors the pressure transducers in the switches and detectors. Block 701 starts this monitoring process. Block 702 transmits the address to analog multiplexer 601 that will select the output from the pressure transducer of switch 201. Analog multiplexer 601 is responsive to this address to transfer the input from the pressure transducer to amplifier 606. After amplifying the signal, amplifier 606 transfers it to A/D converter 602. After an appropriate time has passed, block 703 enables A/D converter 602 to convert the input analog signal to a digital value. Block 704 then reads the digital value from A/D converter 602 via bus 608. Decision block 706 then compares the digital value from A/D converter 602 to an internal stored maximum value for the pressure transducer of switch 201. If the digital value exceeds the stored maximum value, control is transferred to block 722 which activates sound transducer 604 for some predefined amount of time. If the pressure is not excessive, decision block 706 transfers control to block 707. Blocks 707–711, blocks 712–716, and blocks 717–721 function in a manner similar to blocks 702–706 with respect to reading the transducers of switch 202, detector 203, and detector 204, respectively.

Figure 8:
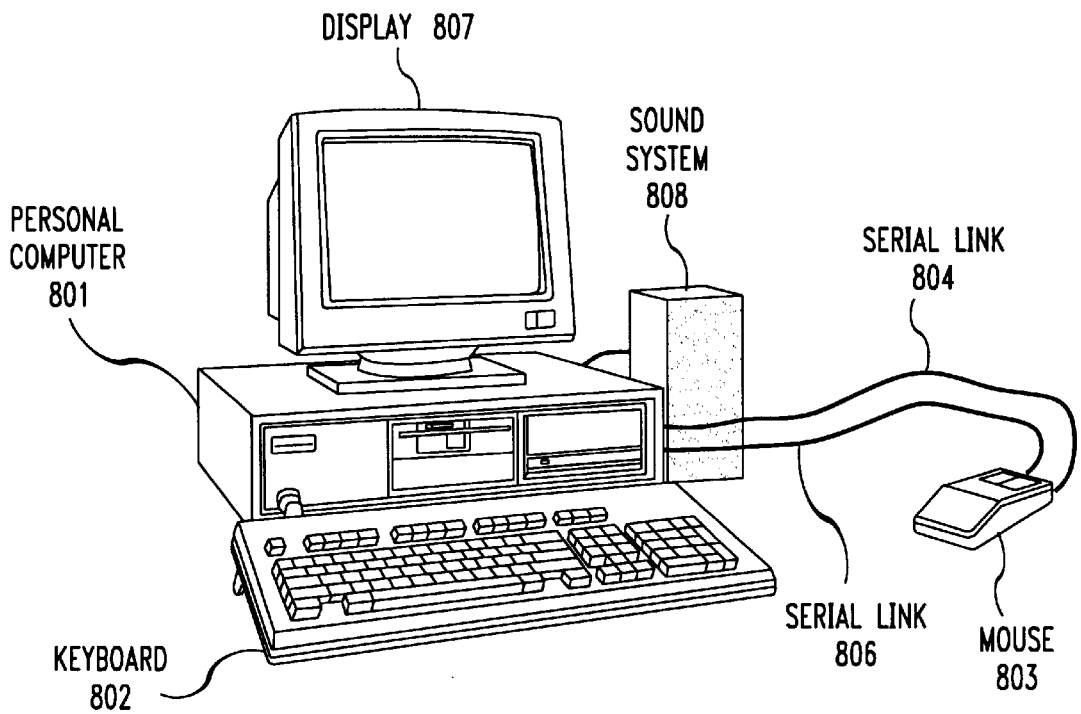
FIG. 8 illustrates, in block diagram form, the interconnection of a computer mouse in accordance with a second embodiment connection to a personal computer.

FIG. 8 illustrates a second embodiment of the invention where mouse 803 transmits pressure information to personal computer 801 via serial link 806. Personal computer 801 is responsive to the transmitted pressure information to determine if the operator of mouse 803 is exerting excessive pressure on the mouse. If personal computer 801 determines that excessive pressure is being exerted, personal computer 801 alerts the operator by displaying a message on display 807 or by using an audio message on sound system 808. The audio message can consist of a synthesized voice message or an alarm signal such as a bell or siren.

Figure 9:
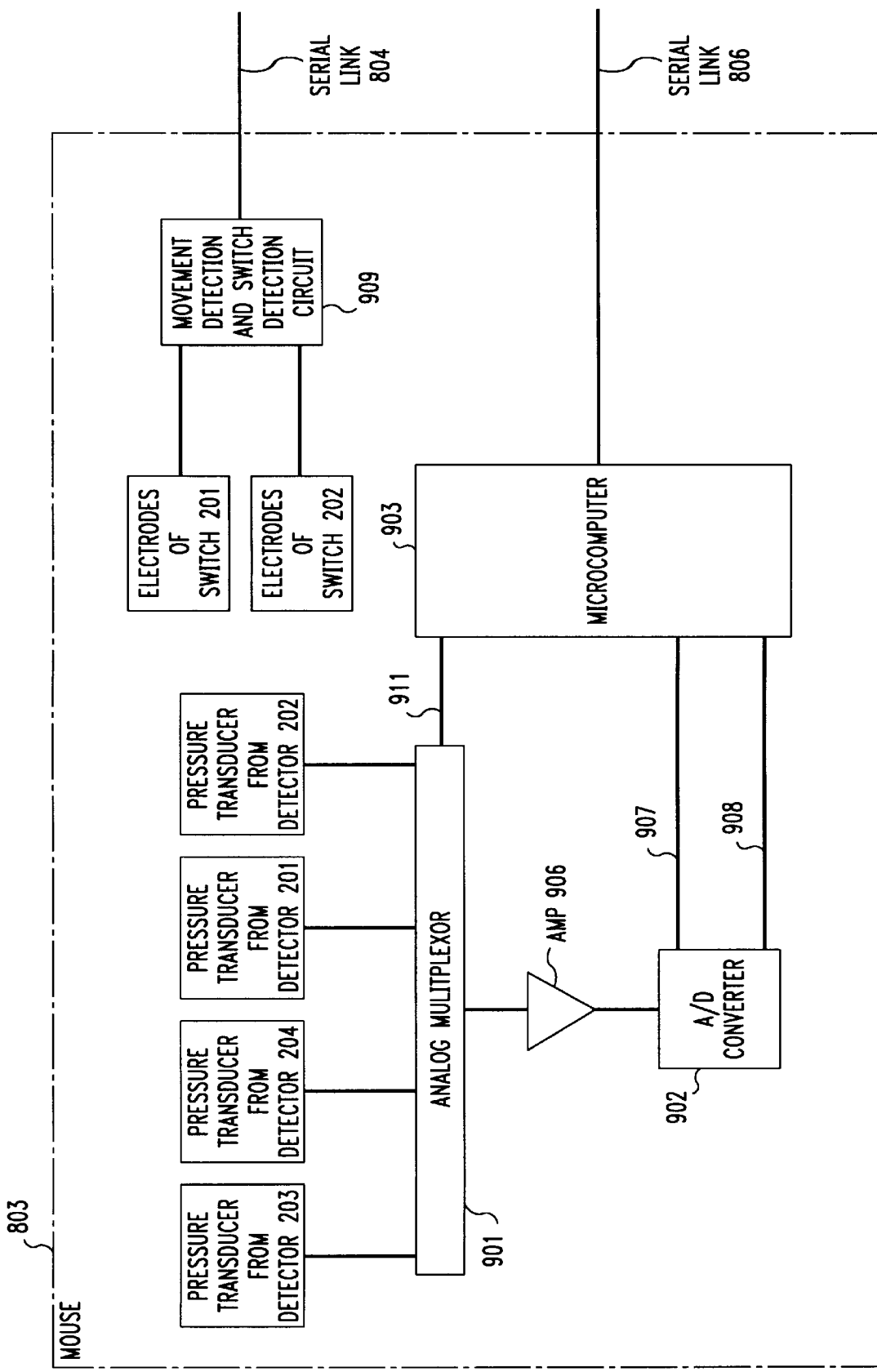
FIG. 9 illustrates the circuitry of a computer mouse in accordance with the second embodiment of the invention.

FIG. 9 illustrates, in block diagram form, the electrical circuitry of mouse 803. Mouse 803 utilizes pressure detectors 203 and 204 and switches 201 and 202 as illustrated in FIGS. 2 through 5. Blocks 901, 902, and 906 perform the same functions as described for blocks 601, 602, and 606 of FIG. 6. Microcomputer 903 is continuously scanning the pressure information generated by the pressure transducers in detectors 203 and 204 and the pressure transducers in switches 201 and 202. Microcomputer 903 performs this scanning by transmitting addresses to analog multiplexor 901. Multiplexor 901 then selects the output of the addressed transducer and transmits this output to amplifier 906. Amplifier 906 amplifies the output and transmits the amplified output to A/D converter 902. When signaled by microcomputer 903, A/D converter 902 converts the amplified output into a digital value which is transmitted to microcomputer 903 via bus 908. Microcomputer 903 is responsive to this transmitted digital value to form a message that includes the digital value and information identifying the pressure transducer whose output resulted in the digital value. Microcomputer 903 then transmits this message to personal computer 801 via serial link 806. One skilled in the art would readily see that by modifying the internal circuitry of personal computer 801 that terminates serial link 804 that the information from microcomputer 903 could be transmitted on serial link 804 along with the information from block 909.

Figure 10:
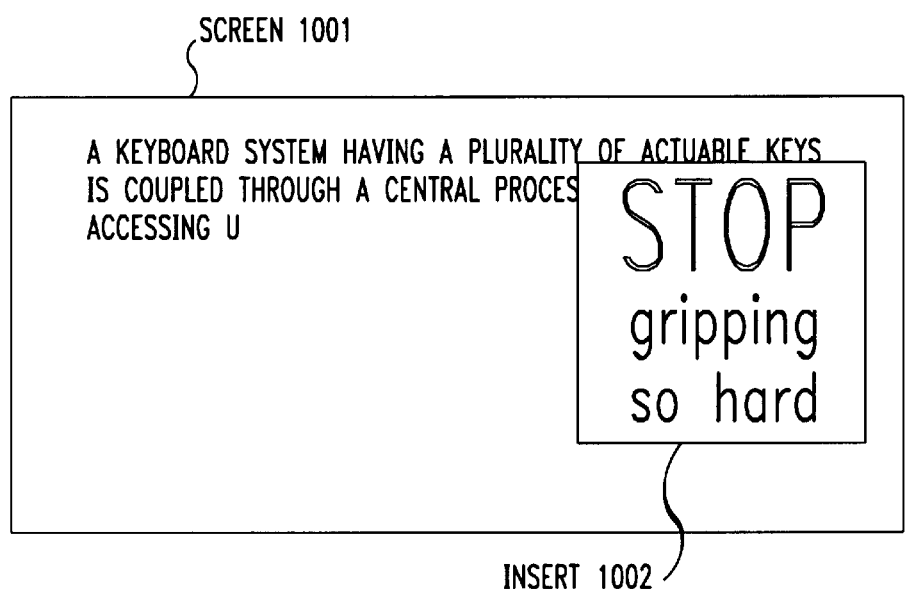
FIG. 10 illustrates a warning message being displayed to an operator on a video display screen.

Personal computer 801 is responsive to the digital value and identification information to determine if too much pressure is being exerted. If too much pressure is being exerted, personal computer 801 alerts the operator via an audio message using sound system 801 or by displaying a visual message on display 807. FIG. 10 illustrates a visual message being utilized to alert the operator that the operator is gripping mouse 803 too hard. Insert 1002 is placed over the material that the operator is presently working on so as to attract the operator's attention.

Figure 11:
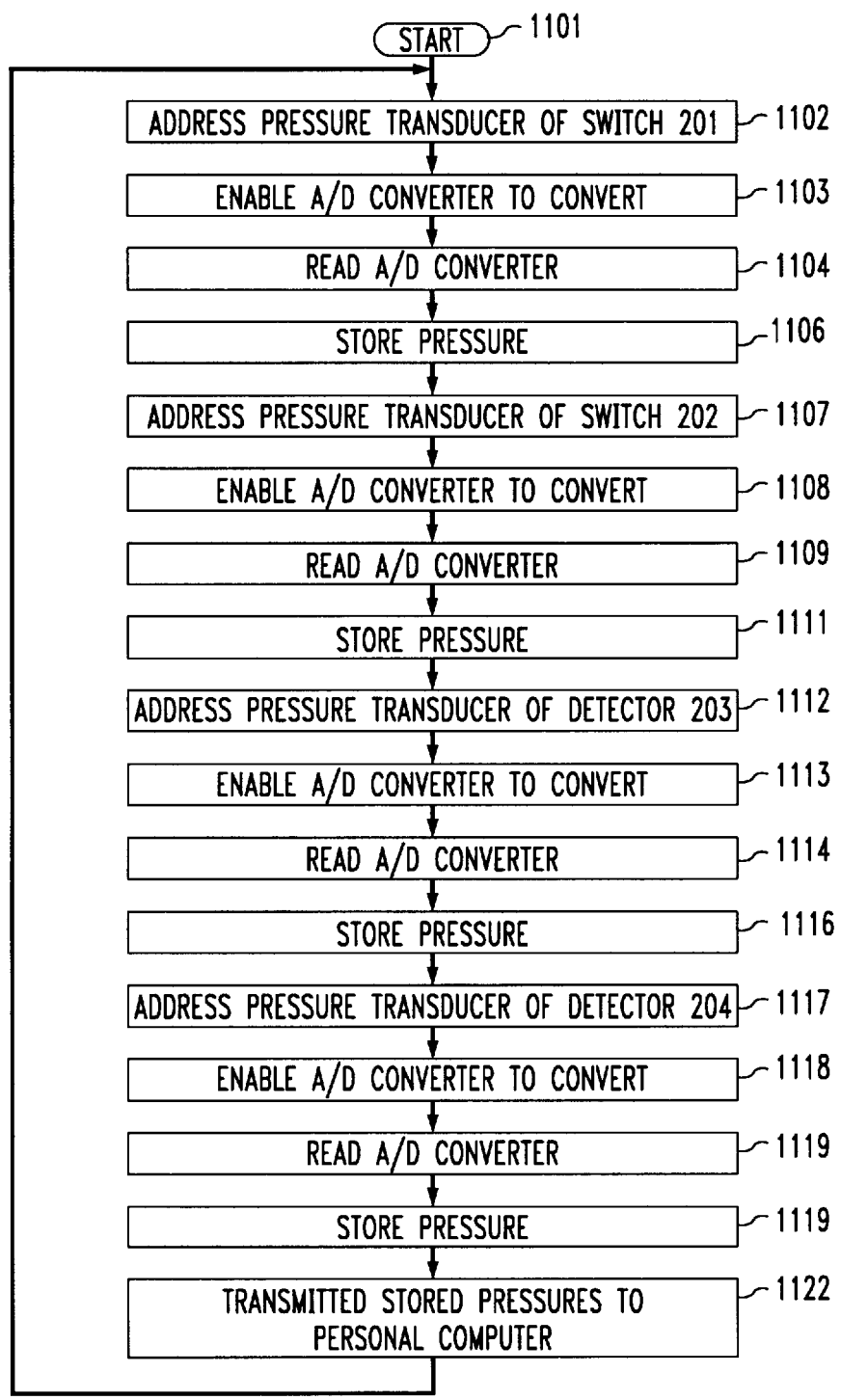
FIG. 11 illustrates, in flow chart form, the operations performed by a microcomputer within a mouse.

FIG. 11 illustrates, in flow chart form, the operations of the program running in microcomputer 903 of FIG. 9. Once the program illustrated in FIG. 11 is activated, it runs continuously. The program is activated by execution of block 1101. Block 1102 transmits an address to analog multiplexer 901 that will select the output of the pressure transducer of switch 201. The output of this pressure transducer is then transferred to A/D converter 902 via analog multiplexer 901 and amplifier 906. Block 1103 enables A/D converter 902 to convert the input analog signal into a digital value. Block 1104 then reads this digital value via bus 908. Block 1106 converts this digital value to a pressure value and stores that value in a pressure list. The list of pressures has four entries with the first entry always being the pressure of pressure transducer on switch 201. Blocks 1107–1111, blocks 1112–1116, and blocks 1117–1121 perform similar operations to those of blocks 1102–1106. After execution of blocks 1102–1121, block 1122 transmits the list of stored pressures to personal computer 801.

Figure 12:
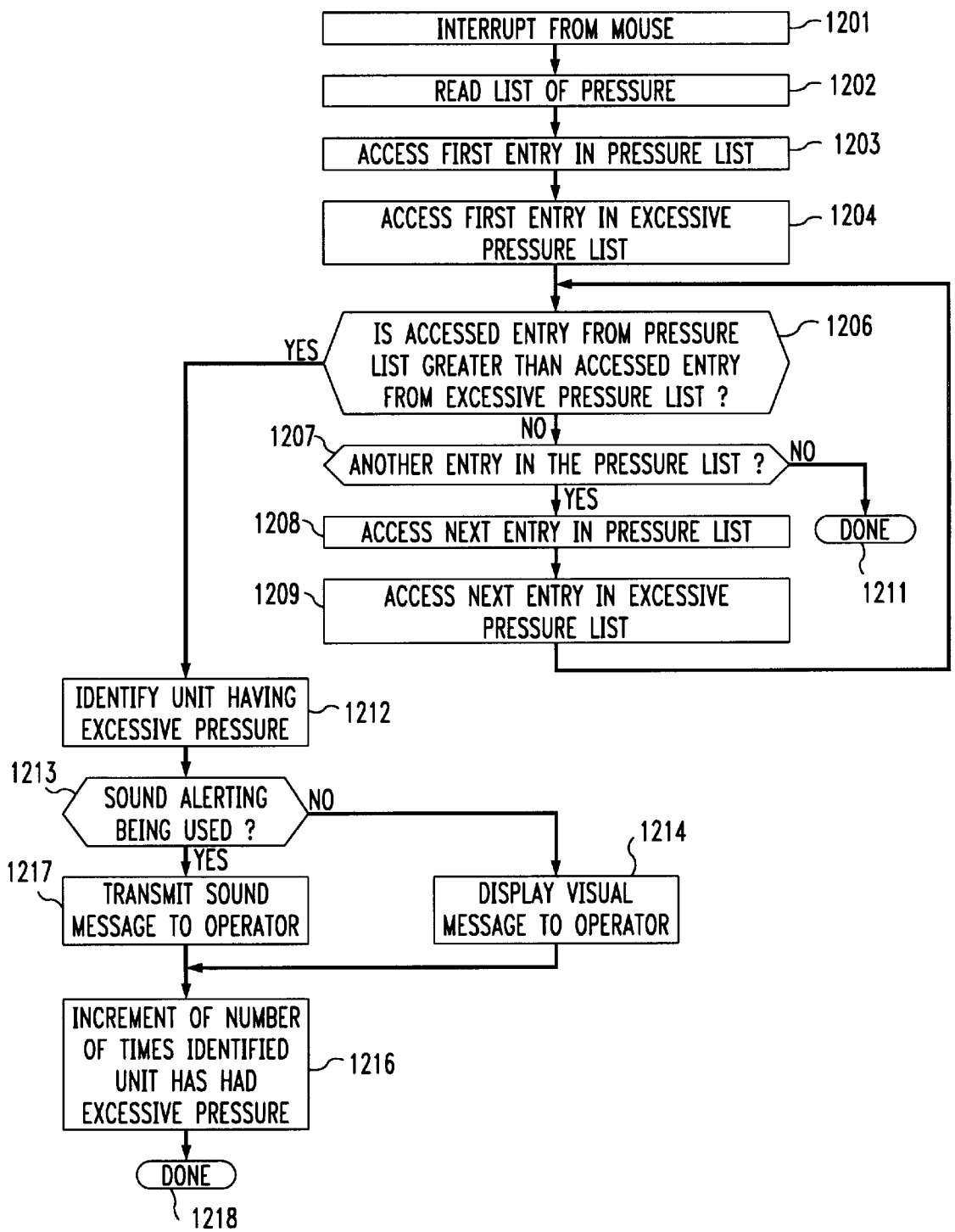
FIG. 12 illustrates, in flow chart form, the operations performed by a computer in response to pressure information from a mouse.

FIG. 12 illustrates, in flow chart form, the program executed by personal computer 801 in response to the list of pressures from microcomputer 903 in mouse 803. The transmission of the list by microcomputer 903 via serial link 806 causes an interrupt in personal computer 801. In response to the interrupt, block 1201 transfers control to block 1202 which reads the list of transmitted pressures and stores this list internal to personal computer 801. Block 1203 accesses the first entry in the pressure list and the first entry in the excessive pressure list. The excessive pressure list has the maximum allowable value for each of the four pressure transducers in mouse 803. The two accessed entries are the pressure on the transducer of switch 201 and the maximum amount that that pressure should be. Decision block 1206 then determines if the pressure being experienced by the pressure transducer is greater than the maximum allowable pressure. If the answer is no, decision block 1207 determines if there is another entry in the pressure list. If the answer is no, processing is terminated by execution of block 1211. If the answer in decision block 1207 is yes, block 1208 accesses the next entry in the pressure list, and block 1209 accesses the next entry in the excessive pressure list. After execution of block 1209, control is transferred back to decision block 1206.

Returning to decision block 1206, if the pressure of the transducer is greater than the maximum allowable pressure, control is transferred to block 1212. Block 1212 utilizes the position in the pressure list of the accessed pressure to identify the unit in mouse 803 that is receiving too much pressure. Decision block 1213 determines if sound or visual alerting is being used. If sound alerting is being used, then block 1217 transmits a sound message to the operator which may identify the unit that the operator is misusing on mouse 803. If visual alerting is being utilized, decision block 1213 transfers control to block 1214. The latter block then displays a visual message to the operator such as the message illustrated in FIG. 10. After execution of either block 1214 or 1217, control is transferred to block 1216 which increments a word maintained within the memory of personal computer 801 that identifies the number of times that each unit has had excessive pressure applied to it. One skilled in the art could readily see that the values listed in the excessive pressure list could be modified via keyboard 802.

It is to be understood that the above-described embodiments are merely illustrative of the principles of the invention and that other arrangements may be devised for those skilled in the art without departing from the spirit and scope of the invention. In particular, one skilled in the art could readily envision other types of pressure transducers being utilized. In addition, one skilled in the art could readily envision the use of a simple voltage threshold detector to determine when excessive pressure was being applied to a pressure transducer. Finally, one skilled in the art could readily envision the use of a single serial link to communicate both the standard mouse movement data and the pressure data to a computer.

The invention claimed is:

1. An apparatus for alerting an operator of excessive pressure being applied to a switch of a computer mouse so as to warn the operator of potential harm to the human body of the operator, comprising:

means for determining pressure exerted on the switch by the operator; and means for generating a message to alert the operator of the computer mouse upon the determined pressure exceeding a predefined pressure wherein application of pressure exceeding the predefined pressure may injure the human body of the operator.

2. The apparatus of claim 1 further comprises means for determining the pressure exerted on computer mouse by the operator gripping the computer mouse so as to move the computer mouse; and the means for generating further responsive to the determined pressure of gripping to alert the operator by the message upon the determined pressure of gripping exceeding another predefined pressure.

3. The apparatus of claim 2 wherein the message is an audio message.

4. An apparatus in a computer for alerting an operator of a computer to excessive pressure applied to a computer mouse by the operator so as to warn the operator of potential harm to the human body of the operator, comprising:

means for receiving a message from the computer mouse wherein the message comprises pressure information; and means for generating a message to alert the operator upon pressure defined by the pressure information exceeding a predefined pressure wherein application of pressure exceeding the predefined pressure may injure the human body of the operator.

5. The apparatus of claim 4 wherein the message to alert is an audio message.

6. The apparatus of claim 4 wherein the message to alert is a visual message.

7. The apparatus of claim 6 wherein the computer further comprises a visual display and the visual message overlays other information being displayed on the visual display.

8. A method for alerting an operator of excessive pressure being applied to a switch of a computer mouse so as to warn the operator of potential harm to the human body of the operator, the method comprising the steps of:

determining pressure exerted on the switch by the operator; and generating a message to alert the operator of the computer mouse upon the determined pressure exceeding a predefined pressure wherein application of pressure exceeding the predefined pressure may injure the human body of the operator.

9. The method of claim 8 further comprises the step of determining the pressure exerted on computer mouse by the operator gripping the computer mouse so as to move the computer mouse; and the step of generating further responsive to the determined pressure of gripping to alert the operator by the message upon the determined pressure of gripping exceeding another predefined pressure.

10. The method of claim 9 wherein the message is an audio message.

11. A method in a computer for alerting an operator of a computer to excessive pressure applied to a computer mouse by the operator so as to warn the operator of potential harm to the human body of the operator, the method comprising the steps of:

receiving a message from the computer mouse wherein the message comprises pressure information; and generating a message to alert the operator upon pressure defined by the pressure information exceeding a predefined pressure wherein application of pressure exceeding the predefined pressure may inure the human body of the operator.

12. The method of claim 11 wherein the message to alert is an audio message.

13. The method of claim 11 wherein the message to alert is a visual message.

14. The method of claim 13 wherein the computer further comprises a visual display and the visual message overlays other information being displayed on the visual display.

\* \* \* \* \*